United States Patent [19]
Hotta et al.

[11] Patent Number: 5,471,044
[45] Date of Patent: Nov. 28, 1995

[54] INFORMATION RECORDING CARD, AND INFORMATION RECORDING AND RECOGNITION METHODS USING THE CARD

[75] Inventors: Yoshihiko Hotta, Mishima; Makoto Kawaguchi, Shizuoka; Tetsuya Amano, Numazu, all of Japan

[73] Assignee: Ricoh Company, Ltd., Tokyo, Japan

[21] Appl. No.: 194,348

[22] Filed: Feb. 8, 1994

[30] Foreign Application Priority Data

Feb. 8, 1993 [JP] Japan ................................ 5-044514

[51] Int. Cl.⁶ .............................................. G06K 19/00
[52] U.S. Cl. .......................... 235/487; 235/380; 235/440; 235/494
[58] Field of Search ........................ 235/487, 494, 235/491, 380, 384, 440; 283/904, 85

[56] References Cited

U.S. PATENT DOCUMENTS

| | | | |
|---|---|---|---|
| 4,349,611 | 9/1982 | Miyakawa et al. | 428/500 |
| 4,954,985 | 9/1990 | Yamazaki | 235/380 |
| 5,055,662 | 10/1991 | Hasegawa | 235/380 |
| 5,151,582 | 9/1992 | Fujioka | 235/440 X |
| 5,198,646 | 3/1993 | Kunimoto | 235/487 X |
| 5,256,618 | 10/1993 | Takahashi et al. | 503/216 |
| 5,321,239 | 6/1994 | Masubuchi et al. | 235/380 |

FOREIGN PATENT DOCUMENTS

| | | | |
|---|---|---|---|
| 0175192 | 9/1985 | Japan | 235/380 |
| 0254371 | 12/1985 | Japan | 235/380 |
| 0211484 | 9/1988 | Japan | 235/487 |

*Primary Examiner*—Donald Hajec
*Assistant Examiner*—Michael G. Lee
*Attorney, Agent, or Firm*—Oblon, Spivak, McClelland, Maier, & Neustadt

[57] ABSTRACT

A card is composed of a reversible thermosensitive recording portion capable of recording information therein, and an irreversible recording portion capable of recording information therein. An information recording method uses the card in which an numerical information is recorded in the reversible thermosensitive recording portion, and an information which has substantially the same contents as those of the numerical information recorded in the reversible thermosensitive recording portion is recorded in the irreversible recording portion for preventing improper alternation of the numerical information recorded in the reversible thermosensitive recording portion. The numerical information recorded in the reversible thermosensitive recording portion and the information recorded in the irreversible recording portion are recognized by an optical device.

16 Claims, 5 Drawing Sheets

INFORMATION RECORDING CARD, AND INFORMATION RECORDING AND RECOGNITION METHODS USING THE CARD

BACKGROUND OF THE INVENTION

1. Field of the Invention

The present invention relates to an information recording card, and an information recording method and an information recognition method each using the card, more particularly to an information recording card comprising a reversible thermosensitive recording portion capable of recording information therein and deleting recorded information therefrom reversibly, and an irreversible recording portion capable of recording information therein, and an information recording method and an information recognition method using such a card.

2. Discussion of Background

Varieties of cards such as prepaid cards and credit cards are currently widely used. Some cards now in general use include a display portion which is capable of displaying, for instance, the balance in the current account, by thermosensitive recording.

Cards of such a thermosensitive recording type, however, use a thermosensitive recording material of the type which does not allow repeated rewriting in the display portion, and the number of the repetition of recording information by rewriting it in the display portion is limited. Furthermore, the size of characters that can be recorded is generally small and the reading thereof is not always easy. In this sense, the cards of the above-mentioned type are not suitable for fine characters such as Chinese characters.

Under such circumstances, it has been proposed to construct a recording display portion of a reversible thermosensitive recording material which is capable of recording information and erasing recorded information reversibly by heating and cooling the reversible thermosensitive recording material, and vice versa.

The thus constructed recording display portion has the advantages that relatively large size characters, not only for the balance in the current account, but also for other detailed information, can be repeatedly written, so that the application of such a reversible thermosensitive recording material to a display portion for information cards attracts attention and is in fact disclosed in Japanese Utility Model Application 2-3876.

However, an information recording card using the above-mentioned thermosensitive recording material in the display portion thereof has the risk that recorded information is altered and falsified, for instance, by altering the balance of a prepaid card to a larger balance than the actual balance in the display portion, or by deleting a "used" notation to make a used card appear a new card, by improperly using the advantage of the information recording card which uses the thermosensitive recording material that recorded information can be rewritten.

Such an altered card cannot be recognized by an information reading apparatus for reading information recorded in the card, and it is conceivable that such altered cards are improperly sold to innocent users. Therefore means for preventing such improper alternation is indispensable.

Japanese Utility Model Application 4-126877 discloses a proposal for preventing such improper alternation in which when a reversible thermosensitive recording portion is heated in an attempt to make an improper alternation, an irreversible thermosensitive sensing portion is colored so that the improper alternation is recognized by the coloring of the irreversible thermosensitive recording portion. In this case, however, it is easy to alter the reversible thermosensitive recording portion by heating only the recording portion without heating the irreversible thermosensitive recording portion.

Furthermore, the temperature at which the color of the irreversible thermosensitive recording portion is changed has to be set at a relatively low temperature. Therefore a card including such a reversible thermosensitive recording portion and an irreversible thermosensitive recording portion happens to be heated to high temperatures, without any intention of making improper alternation, for instance, by the card being placed in a car in the summer, the card will become unusable.

SUMMARY OF THE INVENTION

It is therefore a first object of the present invention to provide a card which comprises a recording portion in which recorded information can be repeatedly rewritten, but is capable of effectively preventing improper alternation of recorded information in the recording portion, with means for recognizing improper alternation of recorded information, if any, being provided.

A second object of the present invention is to provide an information recording method using the above-mentioned card.

A third object of the present invention is to provide an information recognition method using the above-mentioned card.

The first object of the present invention can be achieved by a card comprising a reversible thermosensitive recording portion and an irreversible recording portion, the reversible thermosensitive recording portion being capable of assuming at least two different states at room temperature without the application of energy thereto, in which the color tone and/or transparency of the reversible thermosensitive recording portion are different.

The following are additional preferable conditions for the above-mentioned card according to the present invention:

(1) Recording is carried out in the irreversible recording portion by the application of heat thereto.

(2) The recording temperature of the irreversible recording portion at which recording becomes feasible in the irreversible recording portion is higher than the change initiation temperature of the reversible thermosensitive recording portion.

(3) Recording in the irreversible recording portion is carried out by use of an impact ribbon, or by electrophotography, ink jet printing method or punching.

(4) There are provided a plurality of irreversible recording portions in the card.

(5) There is further provided an information recording portion.

The second object of the present invention can be achieved by an information recording method in which an irreversible recording portion is provided in a card comprising a reversible thermosensitive recording portion, and, when recording, for instance, numerical information, in the reversible thermosensitive recording portion, substantially the same numerical information as that recorded in the reversible thermosensitive recording portion is recorded and displayed in the irreversible recording portion.

The following are additional preferable conditions for the above-mentioned information recording method according to the present invention:

(1) The information recorded in the irreversible recording portion may have errors with plus or minus 20 percent of the numerical information recorded in the reversible thermosensitive recording portion.

(2) Recording for the irreversible recording portion is carried out simultaneously with, immediately before, or immediately after the recording for the reversible thermosensitive recording portion.

(3) Irreversible recording and reversible recording are carried out by an identical thermal head.

(4) The energy application amount and/or the energy application time for the irreversible recording is made different from that for the reversible recording.

(5) The card for use in the above information recording method further comprises an information memory portion, and part of the information recorded in the information memory portion is displayed in the reversible thermosensitive recording portion.

(6) The contents in the information memory portion are renewed in accordance with the state of the use of the card, and the displayed contents in the reversible thermosensitive recording portion are rewritten or new information is added to the reversible thermosensitive recording portion. In addition, new information may also be added to the irreversible recording portion.

The third object of the present invention can be achieved by an information recognition method in which an irreversible recording portion is provided in a card comprising a reversible thermosensitive recording portion, and, when recording, for instance, numerical information, in the reversible thermosensitive recording portion, substantially the same numerical information as that recorded in the reversible thermosensitive recording portion is recorded and displayed in the irreversible recording portion, and the numerical information recorded in the reversible thermosensitive recording portion and in the irreversible recording portion being recognized by optical means.

In the above information recognition method of the present invention, it is preferable that the matching of (i) the numerical information recorded in the reversible thermosensitive recording portion and (ii-a) the numerical information recorded in the irreversible recording portion and/or (ii-b) the numerical information recorded in the information memory portion be judged by information processing means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

With reference to the accompanying drawings, the present invention will now be explained in detail.

Figure 1:
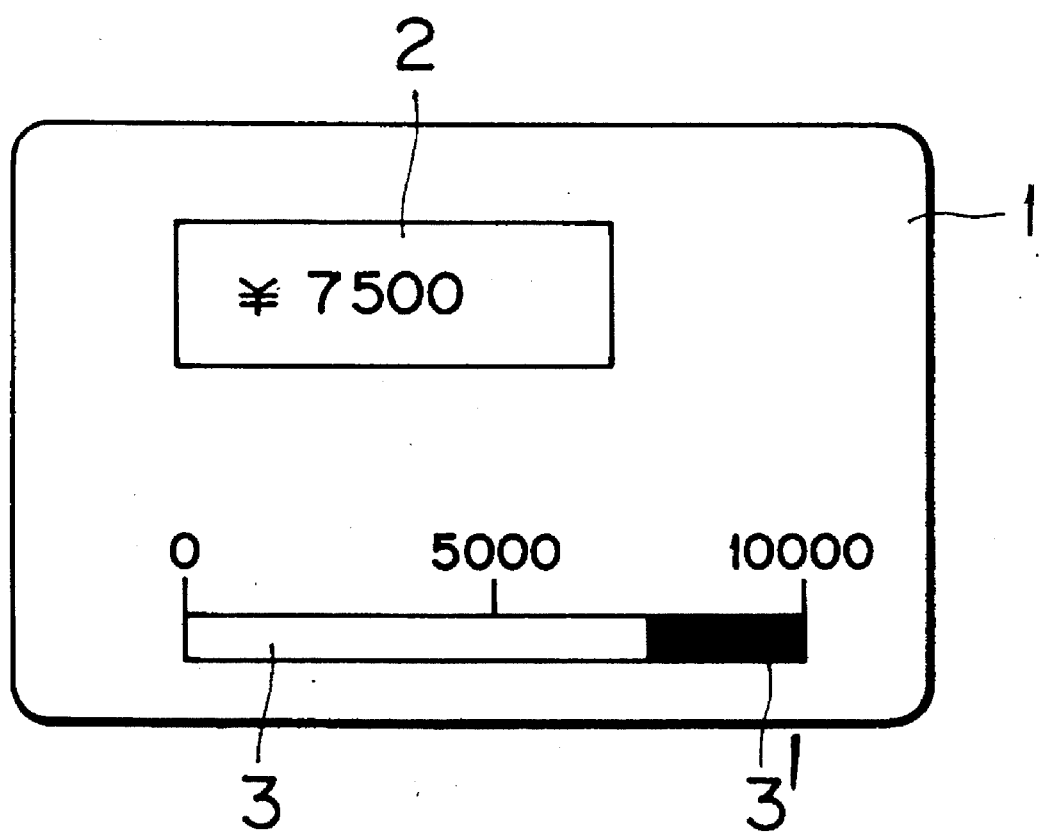
FIG. 1 is a schmatic illustration of a representative example of a card for preventing improper alternation recorded therein according to the present invention.

FIG. 1 is a schematic illustration of an example of a card according to the present invention. Reference numeral 1 indicates the card; reference numeral 2, a reversible thermosensitive recording portion; reference numeral 3, an irreversible recording portion; and reference numeral 3', a recorded portion in the irreversible recording portion 3.

Just for the convenience of explanation, it is supposed that the card 1 is a prepaid card for 10,000 yen. An accurate balance is displayed in the reversible thermosensitive recording portion 2. Whenever this card is used, the amount from the dispenser is deducted from that shown in the reversible thermosensitive recording portion 2, and the balance shown in the reversible thermosensitive recording portion 2 is rewritten to the current balance. At the same time, the amount of money dispensed is shown in the form of a bar graph which is accordingly rewritten.

Thus, by providing both the reversible thermosensitive recording portion 2 and the irreversible recording portion 3, even if the information displayed in the reversible thermosensitive recording portion 2 is improperly altered, since the correct information that cannot be altered remains in the irreversible recording portion 3, if the information displayed in the reversible thermosensitive recording portion 2 is improperly altered, it can be immediately found out, so that such an improper alternation can be effectively prevented.

Figure 2A:
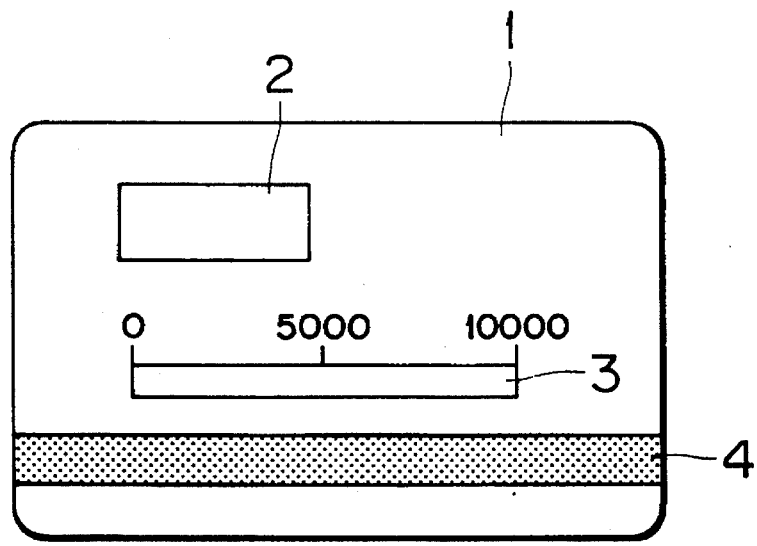
FIG. 2(a) is a schematic illustration of an example of a card provided with an information memory portion according to the present invention.
Figure 2B:
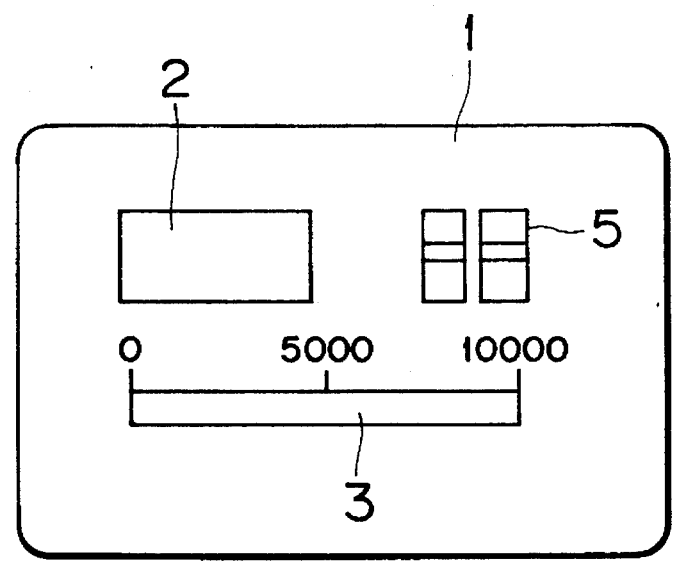
FIG. 2(b) is a schematic illustration of another example of a card provided with an information memory portion according to the present invention.

As mentioned previously, by providing an information memory portion on the card 1, for instance, a magnetic recording portion 4 as illustrated in FIG. 2(a), and an IC memory 5 as illustrated in FIG. 2(b), a variety of kinds of information can be recorded in the information memory portion, whereby, for instance, the correction and reading of recorded information can be performed by a device such as a magnetic head, and only the part of the information recorded in the information memory portion can be displayed in the reversible thermosensitive recording portion 2 and in the irreversible recording portion 3.

In the cards illustrated in FIGS. 2(a) and 2(b), the reversible thermosensitive recording portion 2, the irreversible recording portion 3, and the information memory portion 4 or 5 are provided on the same side of the card 1, but some of them may be provided on the back side of the card 1, or all of them may provided on both sides of the card 1. The reversible thermosensitive recording portion 2 and the irreversible recording portion 3 may be provided side by side on the same side of the card 1.

In the reversible thermosensitive recording portion 2, there is usually displayed numerical information such as the amount of money dispensed, the balance, the number of times used, the number of times remained, and date. Such display may be for only one current numerical information, or for more records including the past information, for instance, the balance at the previous dispensing date, and the current balance with the latest dispensing date.

The numerical information may also include coded information such as bar codes, two-dimensional bar codes, and calra codes.

Figure 3A:
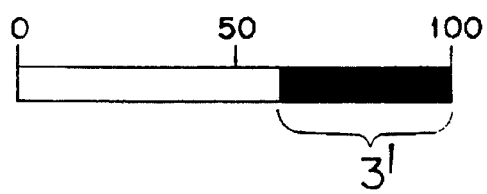
FIGS. 3(a), 3(b) and 3(c) are schematic illustrations of three types of irreversible recording portions for use in the card according to the present invention.
Figure 3B:
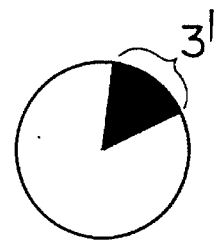
Figure 3C:

In the irreversible recording portion 3, information is displayed by a bar graph as illustrated in FIG. 3(a), a circular graph as illustrated in FIG. 3(b), and a row of dots as illustrated in FIG. 3(c). In accordance with the state of use of the card, information, such as the amount of money used, and the number of times used, is usually recorded in an overwriting manner and displayed by use of any of the above-mentioned display modes.

That the numerical information recorded in the reversible thermosensitive recording portion 2 is substantially the same as that recorded in the irreversible recording portion means that the subject matter of the information recorded in both recording portions is the same and that the information displayed in the irreversible recording portion 3 is displayed with an accuracy by which improper alternation of the information displayed in the reversible portion 2, if any, can be recognized.

Therefore, the information displayed in the irreversible recording portion may be either in a digital display or in an analog display, and is not necessarily displayed with the same accuracy as the accuracy with which the information in the reversible thermosensitive recording portion is displayed. For instance, in the case where the information is displayed in the irreversible recording portion, it is not always necessary that the information is displayed with exactly the same accuracy as that in the reversible thermosensitive recording portion. The number of total usable times, or the amount of total money may be displayed, for example, with a scale unit of 1/20 to 1/5 of the exact amount thereof, or with fractions being counted as a whole number or cut away, for example, by counting fractions of 0.5 and over as a whole unit and cutting away the rest.

Figure 4A:
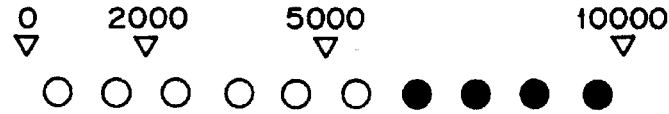
FIGS. 4(a) and 4(b) are diagrams for explaining the relationship between an irreversible thermosensitive recording portion and a reversible thermosensitive recording portion of a card according to the present invention.
Figure 4B:
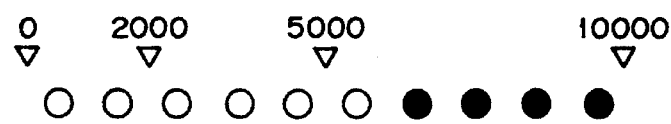

For example, in the case where the total amount of money that can be used is 10,000 yen, the case where the balance is 6,900 yen and the case where the current balance is 6,000 yen may be displayed, respectively in FIGS. 4(a) and 4(b).

Alternatively, 6,900 yen in the reversible thermosensitive recording portion may be displayed as 7,000 yen in the irreversible recording portion by cutting away 900 yen.

In the case of analog display, for example, a bar graph as shown in shown in FIG. 3(a) and a circular graph as shown in FIG. 3(b) are used. Although the accuracy of the display in the irreversible recording portion depends upon the application, errors with plus or minus 20 percent may be acceptable in such an analog display. This is because in order to obtain illicit gains by altering the display in the reversible thermosensitive recording portion, a large alternation will be necessary.

The recording in the irreversible recording portion is carried out simultaneously with, immediately before or immediately after the recording is carried out in the reversible thermosensitive recording portion. The simultaneous recording is advantageous over other recording modes in that the recording in the irreversible recording portion and that in the reversible thermosensitive recording portion are always the same even if the recording is interrupted midway, for instance, by a mishap to the recording device. However, a thermal recording means is required for the simultaneous recording. Recording done by, for instance, punching, in the irreversible recording portion is carried out immediately before or after the recording in the reversible thermosensitive recording portion.

When rewriting the display in the reversible thermosensitive recording portion, there are two cases. In one case, the step of deleting recorded information, and the step of printing new information are separated, and in the other case, the rewriting is done by one step.

In the case where the two steps are separately carried out, a thermal head is usually used for printing, and a hot stamp, a heat roller, hot air blow, and a thermal head are used for deleting recorded information. In this case, it is necessary that the amount of printing energy, printing time period, the number of printing pulses, and the like be changed appropriately. In this case, recording in the irreversible recording portion may be done between the deleting step and the printing step, immediately before the two steps or immediately after the two steps.

In the case where rewriting is done by one step, any of printing energy, printing time, the number of printing pulses, or a combination thereof is controlled with a unit of picture element by a thermal head, whereby rewriting can be done by one step.

In the case where the irreversible recording is carried out by heat, the recording may be done by the thermal head for the reversible thermosensitive recording. The recording conditions may be appropriately set in accordance with the materials used in the irreversible recording portion and the reversible thermosensitive recording portion. Furthermore, the deletion of information recorded by the reversible thermosensitive recording, and the printing by the reversible thermosensitive recording, and the irreversible recording may be carried out by the same thermal head. Alternatively, these three steps may be carried out simultaneously. In this case, with appropriate adjustment of printing energy, printing time, and pulse number by use of the same thermal head, the two recordings and one deletion can be performed under the respective different conditions.

In addition to the visual confirmation of each numerical information, such numerical information can be mechanically detected. For example, it is possible to detect the presence of an improper alteration by detecting the numerical information by transmitted or reflected light and subjecting the detected results to information processing by use of a CPU or the like. The alternation preventing performance can be further improved by matching the numerical information with the numerical information stored in an information memory portion such as an IC.

As the materials for the reversible thermosensitive recording portion for use in the present invention, any materials can be used so long as the transparency or color tone thereof is reversibly changed by heat. It is preferable that the materials for the reversible thermosensitive recording portions be capable of assuming two different states with respect to the color tone and/or transparency thereof at room temperature without the application of heat thereto.

Specific examples of such materials are a material comprising a mixture of two or more kinds of polymer components, which can reversibly assume a transparent state or a milky white state, depending upon the difference in the compatible state of the polymer components in the mixture, as disclosed in Japanese Laid-Open Patent Application 61-258853, liquid crystal polymers with changes in the phase thereof being utilized as disclosed on page 2, right upper column, line 3 to page 4, light upper column, line 17, of Japanese Laid-Open Patent Application 62-66990, and materials which assume a first colored state at a first specific temperature which is above room temperature, and which assume a second colored state when heated to a second specific temperature which is above the first specific temperature and then cooled.

Of the above examples, the materials which can assume two different colored states at a first specific temperature and a second specific temperature are preferably employed.

Specific examples of these materials include a material which assumes a transparent state at a first specific temperature and a milky white state at a second specific temperature (Japanese Laid-Open Patent Application 55-154198), a material which assumes a colored state at a first specific temperature, and a decolorized state at a second specific temperature (Japanese Laid-Open Patent Application 4-247985), a material which assumes a milky white state at a first specific temperature and a transparent state at a second specific temperature (Japanese Laid-Open Patent Application 3-169590), and materials which are colored, for instance, black, red, or blue, at a first specific temperature, and decolorized at a second specific temperature (Japanese Laid-Open Patent Applications 2-188293 and 2-188294).

Of the above-mentioned kinds of materials, a material comprising a resin and an organic low-molecular material which is dispersed in the resin, assumes a transparent state at a first specific temperature, and a milky white state at a second specific temperature and is most preferably employed because of excellent thermal recording sensitivity and durability.

The following are methods for improving such reversible thermosensitive recording materials:

In order to extend the range in which the reversible thermosensitive recording material is in a transparent state at a first specific temperature, two or more different kinds of organic low-molecular weight compounds are appropriately combined or such an organic low-molecular weight compound is used in combination with another material having a melting point which is different from the melting point of the organic low-molecular weight compound. Reversible thermosensitive recording materials of this kind are disclosed, for instance, in Japanese Laid-Open Patent Applications 63-39378, 63-130380, 1-123788, 2-1363, and 3-2089, but are not limited to those reversible thermosensitive recording materials.

In order to facilitate the formation of transparent images, additives such as surfactants and plasticizers can be added to the reversible thermosensitive recording materials. Such additives are disclosed, for instance, in Japanese Laid-Open Patent Applications 63-104879, and 63-178079, but are not limited to those disclosed in the Japanese Laid-Open Patent Applications.

A reversible thermosensitive recording layer may be cross-linked by the application of heat, UV, or EB (electron beam), whereby the durability of the reversible thermosensitive recording layer while in use can be improved. For such improvement, the cross-linking by the application of EB is preferable.

A protective layer may be provided on the reversible thermosensitive recording layer to protect the reversible thermosensitive recording layer.

As the materials for such a protective layer with a thickness of 0.1 to 5 μm, silicone rubber, silicone resin (as disclosed in Japanese Laid-Open Patent Application 63-221087), polysiloxane graft polymer (as disclosed in Japanese Laid-Open Patent Application 63-317385), and ultraviolet curing resin and electron beam curing resin (as disclosed in Japanese Laid-Open Patent Application 4-85077) can be employed. Furthermore, for instance, organic or inorganic materials (as disclosed in Japanese Laid-Open Application 4-85077) or silicone oil may be contained in the protective layer. In any case, a solvent is used for providing the protective layer by coating. It is preferable that such a solvent be a solvent in which the resin used in the reversible thermosensitive recording layer and the low-molecular weight compounds as mentioned above be insoluble or hardly soluble.

Furthermore, in order to improve the contrast of images formed, a reflection layer formed, for instance, by deposition of a metal such as Al may be provided on the reversible thermosensitive recording layer as disclosed in Japanese laid-Open Patent Applications 1-14079, and 1-20193.

The irreversible recording portion 3 can be prepared by any material as long as visible recording can be made and information recorded therein cannot be easily altered.

Examples of a method for recording information in the irreversible recording portion 3 include a method of providing in the irreversible recording portion a thermosensitive recording material comprising a leuco dye and a color developer, or a thermal destructive recording material with a metal such as Sn being deposited thereon; a method of using a thermal transfer ribbon or an impact ribbon; electrophotography; and a recording method using ink jet printing; and a punching method as currently used in telephone cards.

In the case where a thermal transfer ink ribbon, electrophotography, or an ink jet printing method is used, it is preferable to provide a layer comprising a thermoplastic resin, or an organic or inorganic filler, to which the ink for the ink ribbon, toner and ink for ink jet printing are easily transferred.

Of the above-mentioned recording materials, thermosensitive recording materials and thermal image transfer ribbons are preferably employed because with respect to thermosensitive recording materials, the same recording device as for the reversible thermosensitive recording portion can be used for the irreversible recording portion, and with respect to thermal image transfer ribbons, the recording device therefor can be made small sized.

When Sn is used as the material for the previously mentioned light reflection layer, the light reflection layer can also be employed as a thermal destructive recording layer.

Alternatively, part of the reversible thermosensitive recording portion can be used as an irreversible recording portion without using the irreversible recording material, by applying thermal energy which is higher than normally applied thermal energy to the part of the reversible thermosensitive recording portion to permanently destruct the surface or inner structure of the reversible thermosensitive recording portion.

When a thermally-changeable irreversible recording material is employed, it is preferable that the recording temperature for the irreversible recording material be higher than the change-initiation temperature for the reversible thermosensitive recording material. The same thing as for the recording temperature applies to the thermal energy to be applied to the above-mentioned thermally-changeable irreversible recording material.

When a reversible thermosensitive recording material has two state-changing temperatures as mentioned previously, a first specific temperature and a second specific temperature, it is preferable that the recording temperature for the irreversible recording material be higher than the first specific temperature, more preferably, than the second specific temperature.

This is because when information is recorded in the irreversible recording portion, if the temperature of the irreversible recording portion is elevated above its coloring temperature, the irreversible recording portion is colored in its entirety. If this occurs, no information is detectable in the irreversible recording portion. However, if the recording temperature for the irreversible recording material for the irreversible recording portion is higher than the above-mentioned second specific temperature, the probability of the risk that the irreversible recording portion is colored in its entirety can be decreased.

Specifically, a high temperature coloring type thermosensitive recording material comprising a leuco dye and a color developer, and a thermal destructive type recording material with a metal such as Sn being deposited thereon can be given as preferable materials for the above-mentioned irreversible recording portion.

The methods of recording information in the irreversible recording portion by means other than heat, such as impact ribbon, electrophotography, and punching for making holes, have the advantage over the method of recording by use of heat in that there is no risk that heat to be applied to the irreversible recording portion is applied to the reversible thermosensitive recording portion, so that improper alternation of the display in the reversible thermosensitive recording portion, if any, can be easily discovered.

When a plurality of irreversible recording portions is provided, and there are still irreversible recording portions which are not yet used, cards with such not-yet-used irreversible recording portions and a used-up reversible thermosensitive recording portion, in which no additional information can be recorded, for instance, a prepaid card with no balance, can be recovered and used again by initializing the information memory portion and rewriting the numerical information in the reversible thermosensitive recording portion.

In the information memory portion, in addition to the previously mentioned magnetic recording portion 4, and the IC memory 5, an optical memory, and a magneto-optical memory can be employed.

The features of this invention will become apparent in the course of the following description of exemplary embodiments which are given for illustration of the invention and are not intended to be limiting thereof.

EXAMPLE 1

A coating liquid composed of the following components was coated by a wire bar on a white polyethylene terephthalate film with a thickness of about 188 μm, (Trademark "Lumirror X-21" made by Toray Industries, Inc.), which is hereinafter referred to as the PET film:

|  | Parts by Weight |
| --- | --- |
| $\gamma$-$Fe_2O_3$ | 10 |
| Vinyl chloride - vinyl acetate - vinyl alcohol copolymer (Trademark "VAGH" made by Union Carbide Japan K.K.) | 2 |
| Coronate L (10% toluene solution) | 2 |
| Methyl ethyl ketone (MEK) | 43 |
| Toluene | 43 |

The thus coated liquid was dried with the application of heat thereto, whereby a magnetic recording layer with a thickness of about 10 μm was formed on the PET film.

A coating liquid composed of the following components was prepared:

|  | Parts by Weight |
| --- | --- |
| 75% butyl acetate solution of urethane acrylate based ultra-violet curing resin (Trademark "Unidic C7-164" made by Dainippon Ink & Chemicals, Incorporated) | 10 |
| MEK | 10 |

The thus prepared coating liquid was coated on the magnetic layer by a wire bar and was dried with the application of heat thereto and was cured with the application of ultraviolet light by an ultraviolet lamp with a power of 80 W/cm, whereby a lubricating layer with a thickness of about 3 μm was formed on the magnetic layer.

A light reflection layer composed of Al with a thickness of about 400 Å was then provided on the lubricating layer by vacuum deposition of Al.

A coating liquid composed of the following components was prepared:

|  | Parts by Weight |
| --- | --- |
| Vinyl chloride - vinyl acetate phosphoric ester copolymer (Trademark "Denka Vinyl #1000P" made by Denki Kagaku Kogyo Kabushiki Kaisha) | 20 |
| MEK | 40 |
| Toluene | 40 |

The thus prepared coating liquid was coated on the lubricating layer by a wire bar and dried with the application of heat thereto, whereby an adhesive layer with a thickness of about 1 μm was provided on the lubricating layer.

A coating liquid composed of the following components was prepared:

|  | Parts by Weight |
| --- | --- |
| Stearyl stearate (Trademark "M-9676" made by Nippon Oils & Fats Co., Ltd.) | 5 |
| Eicosanedioic acid (Trademark "SL-20*99" made by Okamura Oil Mill, Ltd.) | 5 |
| Vinyl chloride - vinyl acetate copolymer (Trademark "Kaneka M2018" made by Kanegafuchi Chemical Industry Co., Ltd.) | 40 |
| THF | 200 |

-continued

| | Parts by Weight |
|---|---|
| Toluene | 20 |

The thus prepared coating liquid was coated on the adhesive layer and was dried with the application of heat at 130° C. for 3 minutes, whereby a reversible thermosensitive recording layer was formed on the adhesive layer.

A coating liquid composed of the following components was prepared:

| | Parts by Weight |
|---|---|
| 75% butyl acetate solution of urethane acrylate based ultraviolet curing resin (Trademark "Unidic C7-157" made by Dainippon Ink & Chemicals, Incorporated) | 10 |
| Isopropyl alcohol | 10 |

The thus prepared coating liquid was coated on the reversible thermosensitive recording layer by a wire bar and was dried with the application of heat thereto and was cured with the application of ultraviolet light by a ultraviolet lamp with a power of 80 W/cm, whereby a protective layer with a thickness of about 3 μm was formed on the reversible thermosensitive recording layer.

Thus a reversible thermosensitive recording medium was prepared and was heated to 80° C. to make the reversible thermosensitive layer transparent.

Figure 5A:
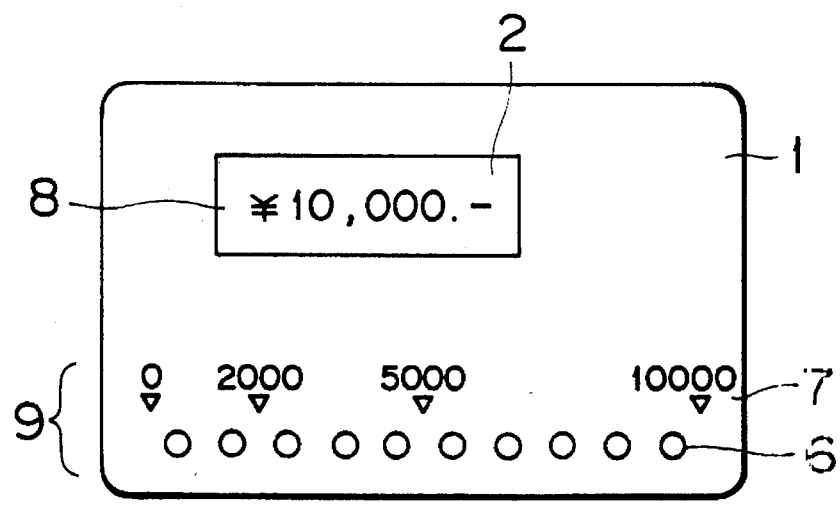
FIGS. 5(a) and 5(b) are schematic illustrations of cards while in use according to the present invention.

A card 1 as illustrated in FIG. 5(a) was prepared by punching the card in the reversible thermosensitive recording medium. In a lower end portion 9 on the thus prepared card, a pattern composed of ten circular marks 6 and numerical information 7 as illustrated in FIG. 5(a) was printed.

Furthermore, a frame 8 as illustrated in FIG. 5(a) was printed to indicate a reversible thermosensitive recording portion 2.

Supposing that this card was a prepaid card for 10,000 yen 10,000 yen was recorded as the initial balance in the reversible thermosensitive recording portion 2 by a thermal head.

Then supposing that 4,000 yen was dispensed, the balance of 10,000 was deleted by bringing a hot stamp heated to 80° C. into contact with the reversible thermosensitive recording portion 2, and rewriting the balance to 6,000 yen.

Figure 5B:
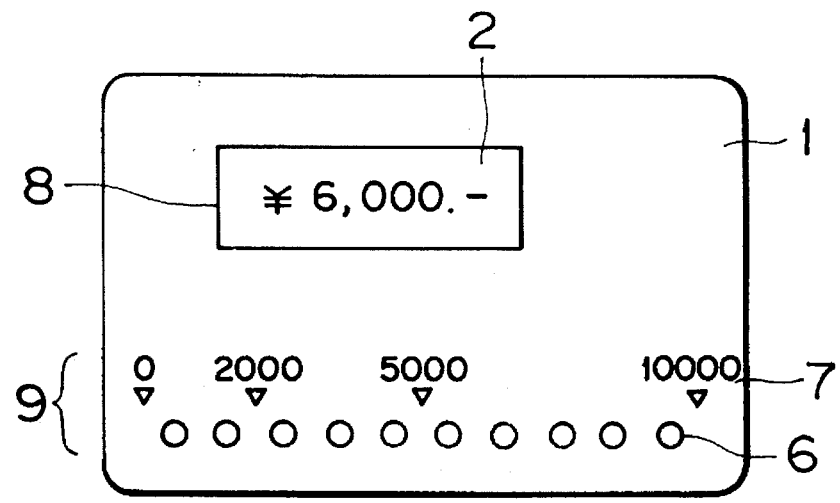

Immediately after this, holes were punched in the portion of the irreversible recording portion shown by the black holes in FIG. 4(b) in order to display that the current balance was 6,000 yen (refer to FIG. 5(b)).

The balance 6,000 yen in the reversible thermosensitive recording portion 2 was altered to 10,000 yen, but the punched holes in the irreversible recording portion remained the same. Thus, it was recognized that the numerical information in the reversible thermosensitive recording portion 2 was improperly altered.

EXAMPLE 2

Figure 6A:
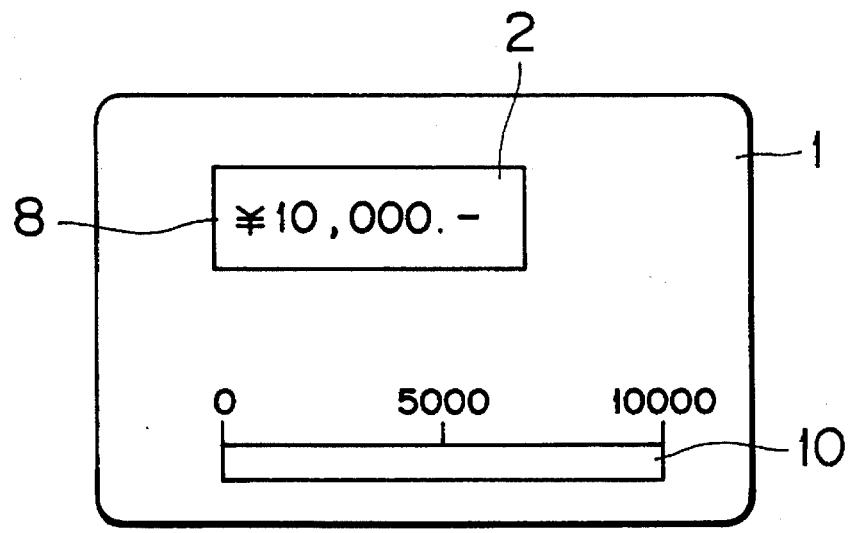
FIGS. 6(a) and 6(b) are schematic illustrations of cards while in use according to the present invention.

The procedure for fabricating the reversible thermosensitive recording medium in Example 1 was repeated except that Al used as the material for the light reflection layer in Example 1 was replaced by Sn, and the irreversible recording portion in Example 1 was replaced by a bar-graph-shaped irreversible recording portion 10 as shown in FIG. 6(a), whereby a card-shaped reversible thermosensitive recording medium was fabricated.

The temperature range in which the reversible thermosensitive recording portion 2 of this recording medium was transparent, which is referred to as a first specific temperature, was in the range of 65° C. to 105° C., and the temperature at which the reversible thermosensitive recording portion 2 became milky white, which is referred to as a second specific temperature, was 115° C. or more.

The temperature at which the irreversible recording portion was irreversibly changed was 180° C. or more.

In the same manner as in Example 1, a numerical information "10,000 yen" was recorded and displayed in the reversible thermosensitive recording portion 2 by use of a printing test machine (made by Yashiro Denki Co., Ltd.) with a thermal head (Trademark "KED-40-8MGK" made by Kyocera Corporation) incorporated therein, with the application of electric pulses with a pulse width of 2.0 sec and a voltage of 12.5 V thereto.

With the application of thermal energy to the entire surface of the reversible thermosensitive recording portion by the thermal head with the application of a voltage of 10.5 V, the recorded numerical information was completely erased, and the reversible thermosensitive recording portion was made transparent.

In the blank reversible thermosensitive recording portion, a numerical information "3,000 yen" was recorded as shown in FIG. 6(a) by the thermal head with the application of a voltage of 12.5 V thereto.

Figure 6B:
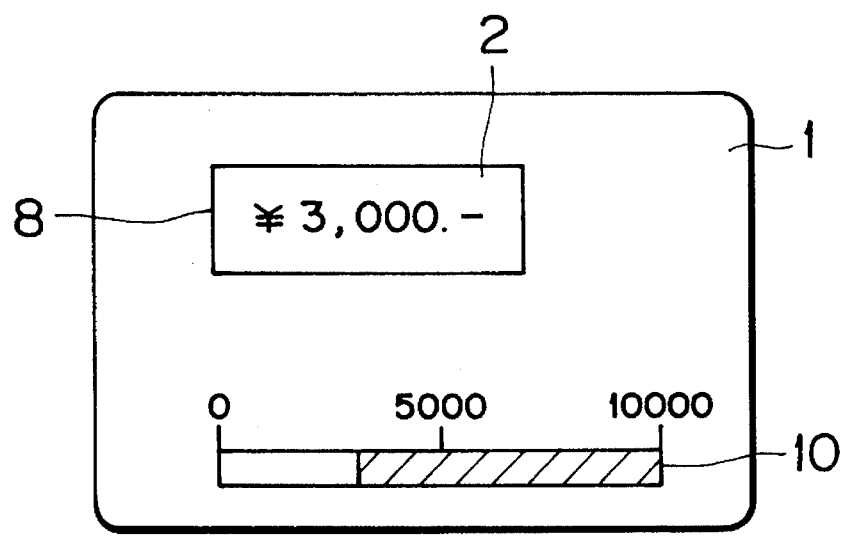

As shown in FIG. 6(b), thermal energy was applied to an irreversible recording portion 10 through the thermal head with the application of 17.0 V until Sn in the light reflection layer was melted and the magnetic layer under the light reflection layer became visible in the shape of a bar graph with a length corresponding to 7,000 yen used.

When a lit cigarette was brought close to both the reversible thermosensitive recording portion 2 and the irreversible recording portion 10, the numerical information displayed in the reversible thermosensitive recording portion 2 was deleted, but the record in the irreversible recording portion was not changed at all.

EXAMPLE 3

In the same card as employed in Example 2, the same numerical information "1,000 yen" was recorded by use of the same recording apparatus as employed in Example 2.

By use of the same thermal head used in Example 2, but with the voltage applied to the thermal head changed with a unit of dot in such a manner that 10.5 V was applied for the background of the reversible thermosensitive recording portion 2, 12.5 V was applied for the numerical information to be recorded in the reversible thermosensitive recording portion 2, and 17.0 V was applied for the irreversible recording portion, the numerical information "10,000 yen" was rewritten to "3,000 yen" and the recording in the irreversible recording portion was conducted in the same manner as in Example 2, as shown in FIG. 6(b).

EXAMPLE 4

A recording medium composed of the same PET film, magnetic recording layer, lubricating layer, and adhesive layer as those employed in the recording medium in Example 1 was prepared in the same manner as in Example 1.

A card was prepared by punching from the above-mentioned recording medium. In an upper portion of the card, the same reversible thermosensitive recording layer and protective layer as those employed in Example 1 were overlaid in the same manner as in Example 1. This portion is for the preparation of a reversible thermosensitive portion.

In the lower portion of the card, an irreversible recording portion was formed as explained below.

Each of Liquid A, Liquid B, and Liquid C was uniformly dispersed with the respective following formulations:

|  | Parts by Weight |
|---|---|
| [Formulation of Liquid A] | |
| Bisphenol A | 20 |
| 10% aqueous solution of completely saponified PVA (Trademark "PVA 117" made by Kuraray Co., Ltd. | 20 |
| Water | 60 |
| [Formulation of Liquid B] | |
| 3-di(N-ethyl)amino-6-methyl-7-anilinofuoran (Trademark "ODB" made by Yamamoto Chemicals, Inc.) | 20 |
| 10% aqueous solution of completely saponified PVA (Trademark "PVA 117" made by Kuraray Co., Ltd.). | 20 |
| Water | 60 |
| [Formulation of Liquid C] | |
| Calcium carbonate (Trademark "Tsunex E" made by Shiraishi Calcium Kaisha, Ltd.) | 20 |
| Zinc stearate (Trademark "Zinc Stearate GF200" made by Nippon Oils & Fats Co., Ltd.) | 5 |
| 10% aqueous solution of completely saponified PVA (Trademark "PVA 117" made by Kuraray Co., Ltd.) | 25 |
| Water | 50 |

3 parts by weight of Liquid A, one part by weight of Liquid B, and 3 parts by weight of Liquid C were uniformly mixed to prepare a coating liquid for the formation of an irreversible recording portion.

The thus prepared coating liquid was coated on the lower portion of the card and dried, so that a portion for the previously mentioned irreversible recording portion with a thickness of about 5 µm was formed.

In the same manner as in Example 2, a frame for a reversible thermosensitive recording portion was printed in the upper portion of the card, and a bar-graph-shaped frame for an irreversible recording portion were printed in the lower portion of the card, whereby a reversible thermosensitive recording portion and an irreversible recording portion for this card were formed.

The temperature at which the color of the irreversible recording portion was irreversibly changed was about 120° C.

Recording in the reversible thermosensitive recording portion and that in the irreversible recording portion were conducted in the same manner as in Example 2 except that the recording in the irreversible recording portion was carried out by the thermal head with the application of a voltage of 12.5 V. Writing and rewriting information in the reversible thermosensitive recording portion were possible in the same manner as in the card prepared in Example 2.

EXAMPLE 5

The procedure for the fabrication of the card in Example 4 was repeated except that Bisphenol A employed in Liquid A for the fabrication of the irreversible recording portion was replaced by dibenzyl p-hydroxybenzoate, whereby a card was fabricated.

The temperature at which the color of the irreversible recording portion was irreversibly changed was about 80° C.

Recording in the reversible thermosensitive recording portion and that in the irreversible recording portion were conducted in the same manner as in Example 2 except that the recording in the irreversible recording portion was carried out by the thermal head with the application of a voltage of 10.5 V. Writing and rewriting information in the reversible thermosensitive recording portion were possible in the same manner as in the card prepared in Example 2.

By use of the cards fabricated in Example 4 and Example 5 as prepaid cards, a numerical information "10,000 yen" was recorded in the reversible thermosensitive recording portion of each card.

Supposing that 4,000 yen was dispensed from each card, the numerical information "10,000 yen" was rewritten by deleting the numerical information by a hot stamp heated to 90° C. and then by recording a numerical information "6,000 yen" by a thermal head.

Thereafter, a portion in the irreversible recording portion of each card was colored in the shape of a bar graph corresponding to 4,000 yen by the application of heat thereto.

The bar-shaped colored portion in the irreversible recording portion of the card fabricated in Example 5 was heated by a hot stamp heated to 90° C. The portion around the bar-shaped colored portion was also colored. As a result, it was impossible to recognize the balance shown in the irreversible recording portion.

The bar-shaped colored portion in the irreversible recording portion of the card fabricated in Example 4 was also heated by the hot stamp heated to 90° C. However, the portion around the bar-shaped colored portion was not colored at all, so that it was possible to recognize the balance shown in the irreversible recording portion.

What is claimed is:

1. A card comprising:
   a reversible thermosensitive recording portion capable of recording information therein and deleting recorded information therefrom reversibly, wherein the information recorded in the reversible thermosensitive recording portion is visually displayed; and
   an irreversible recording portion capable of recording information therein which cannot be deleted, the information recorded in the irreversible recording portion being substantially the same contents as the information recorded in the reversible recording portion and also being visually displayed;
   wherein said reversible thermosensitive recording portion is capable of assuming at least two different states with respect to the color tone and/or transparency thereof.

2. The card as claimed in claim 1, wherein said irreversible recording portion is capable of recording information by the application of heat thereto.

3. The card as claimed in claim 1, wherein said reversible thermosensitive recording portion is capable of assuming a first color when heated to a first specific temperature higher than room temperature, and is capable of assuming a second color when heated to a second specific temperature higher than said first specific temperature and then cooled, and said irreversible recording portion is capable of recording information by the state thereof being changed when heated to a temperature higher than said first specific temperature.

4. The card as claimed in claim 1, wherein said irreversible recording portion is capable of recording information by a method selected from the group consisting of a method of using an impact ribbon, an electrophotographic method, an ink jet printing method, and a punching hole method.

5. The card as claimed in claim 1, wherein said irreversible recording portion comprises a plurality of irreversible recording parts.

6. The card as claimed in claim 1, further comprising an information recording portion.

7. An information recording method using a card comprising a reversible thermosensitive recording portion capable of recording information therein and deleting recorded information therefrom reversibly, and an irreversible recording portion capable of recording information therein, comprising the steps of:

recording first information in said reversible thermosensitive recording portion, wherein said first information is visually displayed; and recording second information in said irreversible recording portion, the second information having substantially the same contents as the first information recorded in said reversible thermosensitive recording portion, and the second information being visually displayed.

8. The information recording method as claimed in claim 7, wherein said second information recorded in said irreversible recording portion may have errors with plus or minus 20 percent of said first information recorded in said reversible thermosensitive recording portion.

9. The information recording method as claimed in claim 7, wherein the step of recording the second information in said irreversible recording portion is carried out simultaneously with, immediately before, or immediately after the step of recording the first information in said reversible thermosensitive recording portion.

10. The information recording method as claimed in claim 7, wherein the step of recording the second information in said irreversible recording portion and the step of recording the first information in said reversible thermosensitive recording portion are thermally carried out by an identical thermal head.

11. The information recording method as claimed in claim 10, wherein the time for applying energy for recording the second information in said irreversible recording portion is different from a time for applying energy for recording the first information in said reversible thermosensitive recording portion.

12. The information recording method as claimed in claim 7, wherein said card further comprises an information memory portion with third information stored therein, and part of said third information is displayed in said reversible thermosensitive recording portion.

13. The information recording method as claimed in claim 12, wherein at least part of the third information stored in said information memory portion is renewed, the first information recorded in said reversible thermosensitive recording portion is rewritten or an additional information is added to the second information recorded in said irreversible thermosensitive recording portion, and an additional information is recorded in said irreversible recording portion.

14. The information recording method as claimed in claim 7, wherein the first information is numerical information.

15. An information recognition system for a card comprising:

a reversible thermosensitive recording portion in which numerical information is recorded, wherein the numerical information recorded in the reversible recording portion is visually displayed; and an irreversible recording portion in which an information which has substantially the same contents as the numerical information recorded in said reversible thermosensitive recording portion is recorded in said irreversible recording portion and is also visually displayed;

wherein said numerical information recorded in said reversible thermosensitive recording portion and said information recorded in said irreversible recording portion are recognized by optical means.

16. An information recognition system for a card comprising:

a reversible thermosensitive recording portion in which numerical information is recorded, wherein the numerical information recorded in the reversible recording portion is visually displayed;

an irreversible recording portion in which an information which has substantially the same contents as said numerical information recorded in said reversible thermosensitive recording portion is recorded in said irreversible recording portion, and is also visually displayed; and an information memory portion in which information is stored;

wherein the matching of said numerical information recorded in said reversible thermosensitive recording portion, said information recorded in said irreversible recording portion, and said information stored in said information memory portion is judged by information processing means.

* * * * *

UNITED STATES PATENT AND TRADEMARK OFFICE
CERTIFICATE OF CORRECTION

PATENT NO. : 5,471,044
DATED : November 28, 1995
INVENTOR(S) : Yoshihiko HOTTA et al.

It is certified that error appears in the above-indentified patent and that said Letters Patent is hereby corrected as shown below:

In column 3, line 59, change "schmatic" to --schematic--.

In column 8, line 6, before "Application" insert --Patent--.

In column 12, line 20, change "KED" to --KEB--.

Signed and Sealed this

Ninth Day of September, 1997

BRUCE LEHMAN

Attest:

Attesting Officer

Commissioner of Patents and Trademarks